(12) United States Patent
Young (10) Patent No.: US 11,208,024 B2
(45) Date of Patent: Dec. 28, 2021

(54) DUAL SIDE BULK MATERIAL TENDER

(71) Applicant: HEARTLAND AGRICULTURE, LLC, Hutchinson, MN (US)

(72) Inventor: Andrew Young, Hutchinson, MN (US)

(73) Assignee: Heartland Agriculture, LLC, Hutchinson, MN (US)

(*) Notice: Subject to any disclaimer, the term of this patent is extended or adjusted under 35 U.S.C. 154(b) by 0 days.

(21) Appl. No.: 16/922,138

(22) Filed: Jul. 7, 2020

(65) Prior Publication Data

US 2020/0331378 A1 Oct. 22, 2020

(51) Int. Cl.
| | |
|---|---|
| *B60P 1/42* | (2006.01) |
| *H04L 12/46* | (2006.01) |
| *H04L 12/717* | (2013.01) |
| *H04L 12/741* | (2013.01) |
| *H04L 12/801* | (2013.01) |
| *H04L 12/911* | (2013.01) |
| *H04L 29/12* | (2006.01) |
| *H04L 29/06* | (2006.01) |
| *B62D 63/06* | (2006.01) |

(52) U.S. Cl.
CPC ............ *B60P 1/42* (2013.01); *H04L 12/4633* (2013.01); *H04L 45/42* (2013.01); *H04L 45/74* (2013.01); *H04L 47/115* (2013.01); *H04L 47/12* (2013.01); *H04L 47/781* (2013.01); *H04L 61/6063* (2013.01); *H04L 69/22* (2013.01); *B62D 63/068* (2013.01)

(58) Field of Classification Search
CPC ......................................................... B60P 1/42
See application file for complete search history.

(56) References Cited

U.S. PATENT DOCUMENTS

| | | | | |
|---|---|---|---|---|
| 2,960,320 A | * | 11/1960 | Heider ................ | B01F 13/0035 366/133 |
| 4,411,581 A | * | 10/1983 | Niewold .............. | B65G 41/002 222/163 |
| 5,468,113 A | | 11/1995 | Davis | |

(Continued)

FOREIGN PATENT DOCUMENTS

JP 2007104903 4/2007

OTHER PUBLICATIONS

International Search Report and Written Opinion for PCT/US2021/018677, Intl. Filing Date: Feb. 19, 2021 and all references cited therein.

*Primary Examiner* — Jonathan Snelting
(74) *Attorney, Agent, or Firm* — Hovey Williams LLP (57) ABSTRACT

A bulk material tender includes a mobile frame, a hopper, and a discharge system. The mobile frame has a left side and a right side. The hopper is disposed on the mobile frame. The discharge system is configured to discharge particulate matter from the hopper. The discharge system includes a discharge auger, a deploying actuator, and a positioning actuator. The discharge auger presents a proximal end and a distal end. The deploying actuator is configured to selectively emplace the discharge auger in a stowed orientation and a deployed orientation, wherein the distal end is adjacent to the hopper in the stowed orientation. The positioning actuator configured to selectively emplace the discharge auger along the left side and the right side of the mobile frame. Once emplaced, the discharge auger discharges particulate material from the hopper toward a target location.

12 Claims, 9 Drawing Sheets

(56) References Cited

U.S. PATENT DOCUMENTS

| | | | |
|---|---|---|---|
| 6,113,339 A | 9/2000 | Wesley | |
| 7,938,613 B2 * | 5/2011 | Yoder | A01D 41/1217 |
| | | | 414/518 |
| 9,061,834 B2 * | 6/2015 | Mulder | A01F 12/46 |
| 9,090,198 B2 | 7/2015 | Bryce et al. | |
| 9,457,971 B2 * | 10/2016 | Bonefas | G06T 7/62 |
| 10,071,669 B2 * | 9/2018 | Kinzenbaw | B60P 1/42 |
| 10,390,489 B2 * | 8/2019 | Winsnes | B65G 45/005 |
| 2011/0164952 A1 | 7/2011 | Hollenberg | |
| 2015/0023767 A1 | 1/2015 | Sheldon | |
| 2015/0203019 A1 | 7/2015 | Jon | |
| 2019/0009994 A1 | 1/2019 | Beelman, III et al. | |

* cited by examiner

Fig. 8

DUAL SIDE BULK MATERIAL TENDER

FIELD OF THE INVENTION

The present disclosure generally relates to bulk material tenders, and more specifically to discharge augers that allow discharge on more than one side of the bulk material tender.

BACKGROUND

Bulk material tenders are used to transport and deliver any of various particulate matter. The bulk material tender is typically loaded with the particulate matter and then driven or pulled to a target location. The particulate matter is then discharged at the target location. As an example, the bulk material tender may transport fertilizers and other material to an agricultural farm, application equipment, or offsite destination. The fertilizers are added to a hopper of the bulk material tender, the bulk material tender is driven or pulled to the agricultural farm, and the fertilizers are discharged as the bulk material tender moves along a side of the agricultural farm, into a vehicle associated with the farm, etc. Later, the fertilizers are distributed throughout the agricultural farm.

The discharge augers of traditional single-side bulk material tenders are limited in mobility and functionality without the addition of a vertical auger. Traditional single-side discharge augers have a limited range of motion and are only capable of discharging on one side of the bulk material tender. This limits or eliminates an operator's ability to select a height of discharge or a side of the discharge and adds restrictions for mobility of the bulk material tender in relation to applicator or target discharge location.

This background discussion is intended to provide information related to the present invention which is not necessarily prior art.

BRIEF SUMMARY

Embodiments of the invention solve the above-mentioned problems (as well as other problems) by providing an bulk material tender with a dual side discharge auger that is configured to discharge and be stowed on two respective sides of the bulk material tender. This provides an advantage over bulk material tenders of the prior art, which limit the side of storage, deployment, and the height of the deployment.

A first embodiment of the invention is directed to an bulk material tender. The bulk material tender includes a mobile frame, a hopper, and a discharge system. The mobile frame has a left side and a right side. The hopper is disposed on the mobile frame. The discharge system is configured to discharge particulate matter from the hopper. The discharge system includes a discharge auger, a deploying actuator, and a positioning actuator. The discharge auger presents a proximal end and a distal end. The deploying actuator is configured to selectively emplace the discharge auger in a stowed orientation and a deployed orientation, wherein the distal end is adjacent to the hopper in the stowed orientation. The positioning actuator configured to selectively emplace the discharge auger along the left side and the right side of the mobile frame. Once emplaced, the discharge auger discharges particulate material from the hopper toward a target location.

A second embodiment of the invention is directed to a discharge system configured to discharge particulate matter from a hopper toward a target location. The discharge system includes a discharge auger, a deploying actuator, and a positioning actuator. The discharge auger presents a proximal end and a distal end. The deploying actuator is configured to selectively emplace the discharge auger in a stowed orientation and a deployed orientation. The distal end is adjacent to the hopper in the stowed orientation. The positioning actuator configured to selectively emplace the discharge auger along the left side and the right side of the hopper.

A third embodiment of the invention is direction to a method of discharging particulate matter from a hopper having a first side and a second side, the method comprising: deploying, via a deploying actuator, a discharge auger from a stowed position adjacent to the hopper on the first side to a deployed position; rotating, via a positioning actuator, the discharge auger to a first discharging position on the first side; rotating, via the positioning actuator, the discharge auger to a second discharging position on the second side; and activating the discharge auger to move the particulate matter from the hopper toward a target location.

Additional embodiments of the invention may be directed to a discharge system as described herein, including a discharge auger, a positioning actuator, and a deploying actuator. Still other embodiments of the invention may be directed to a discharge auger configured to deploy to a left side and a right side. Yet still other embodiments of the invention may be directed to a computerized method of controlling a bulk material tender. Yet still further embodiments of the invention may be directed to a non-transitory computer readable storage medium, having a computer program thereon which directs at least one processing element to perform steps for controlling a bulk material tender.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. For instance, the drawing figures do not limit the present invention to the specific embodiments disclosed and described herein. Furthermore, directional references (for example, top, bottom, up, and down) are used herein solely for the sake of convenience and should be understood only in relation to each other. For instance, a component might in practice be oriented such that faces referred to as "top" and "bottom" are sideways, angled or inverted relative to the chosen frame of reference.

Exemplary Bulk Material Tender

Embodiments of the invention are directed to a bulk material tender 10. As discussed above, bulk material tenders 10 are utilized to provide a particulate matter to a target location. Examples of particulate matter include fertilizers, feed, seeds, agricultural commodities, and the like. The bulk material tender 10 broadly includes a mobile frame 12, a hopper 14, and a discharge system 16. The mobile frame 12 provides mobility such that the bulk material tender 10 may move or be moved between locations. The hopper 14 receives and stores the particulate matter during the transportation. The discharge system 16 discharges the particulate matter upon arrival at the target location to either side of the mobile frame 12.

Figure 1:
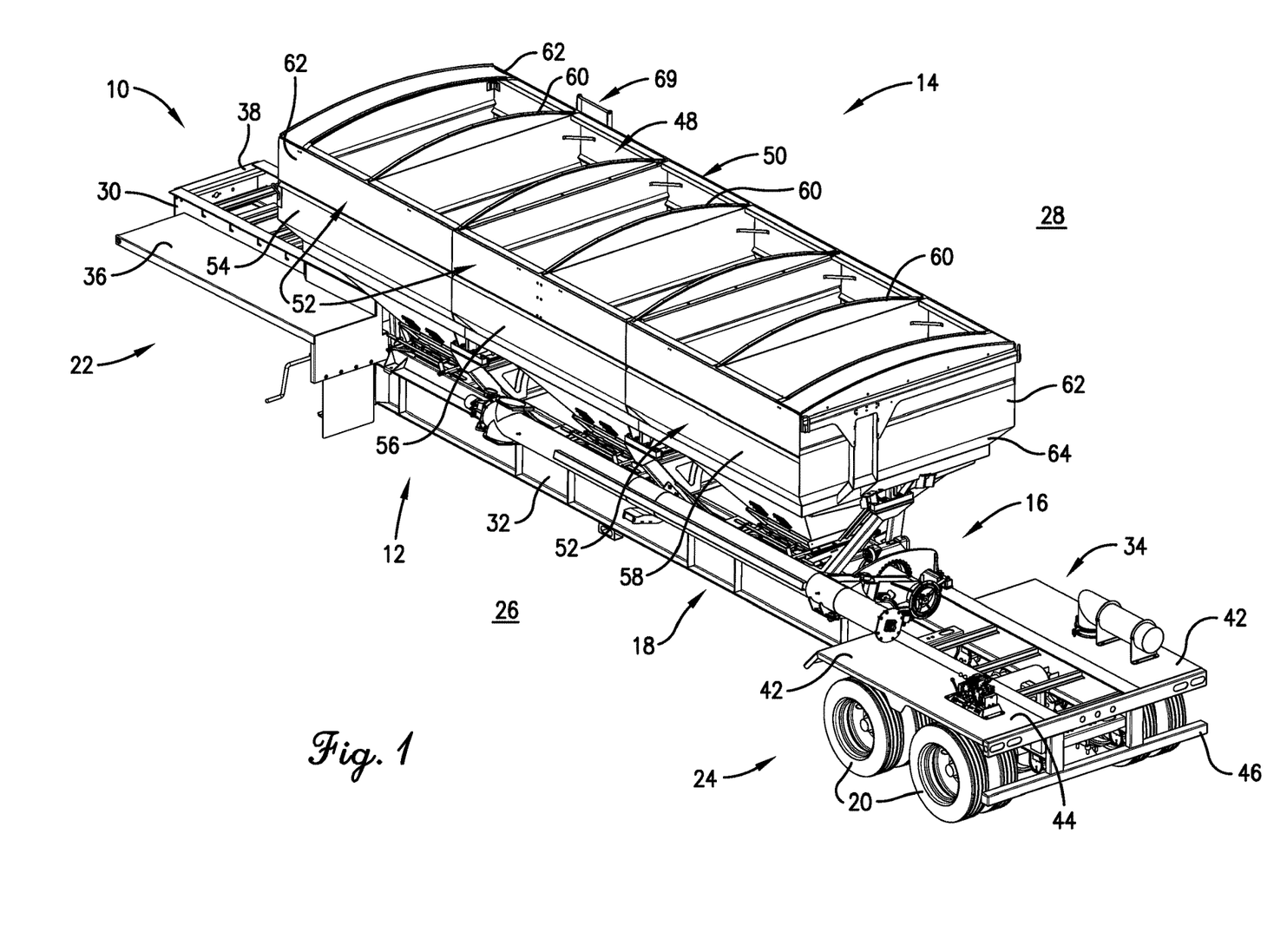
FIG. 1 is a perspective view of a bulk material tender, having a discharge auger stowed on a left side.

Generally, the mobile frame 12 includes a chassis 18 and wheels 20, as best shown in FIG. 1. The wheels 20 are rotatably secured to the chassis 18 such that the mobile frame 12 may move (under its own or an external power, as discussed below). The chassis 18 supports the various other components discussed herein, such as the hopper 14 and the discharge system 16. In other embodiments, the bulk material tender 10 may include a static frame in lieu of the mobile frame.

Figure 3:
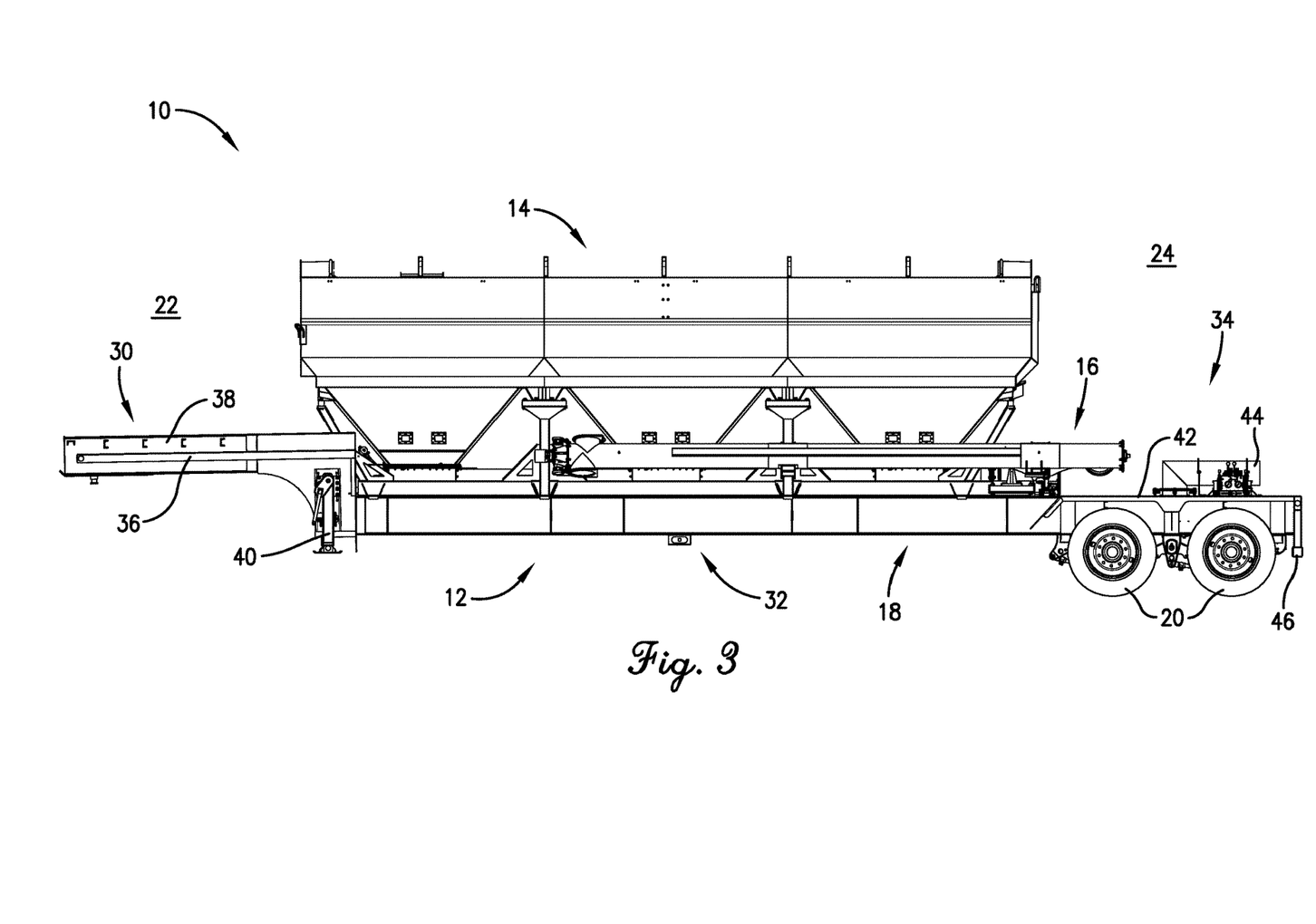
FIG. 3 is a side view of the bulk material tender of FIG. 1.
Figure 4:
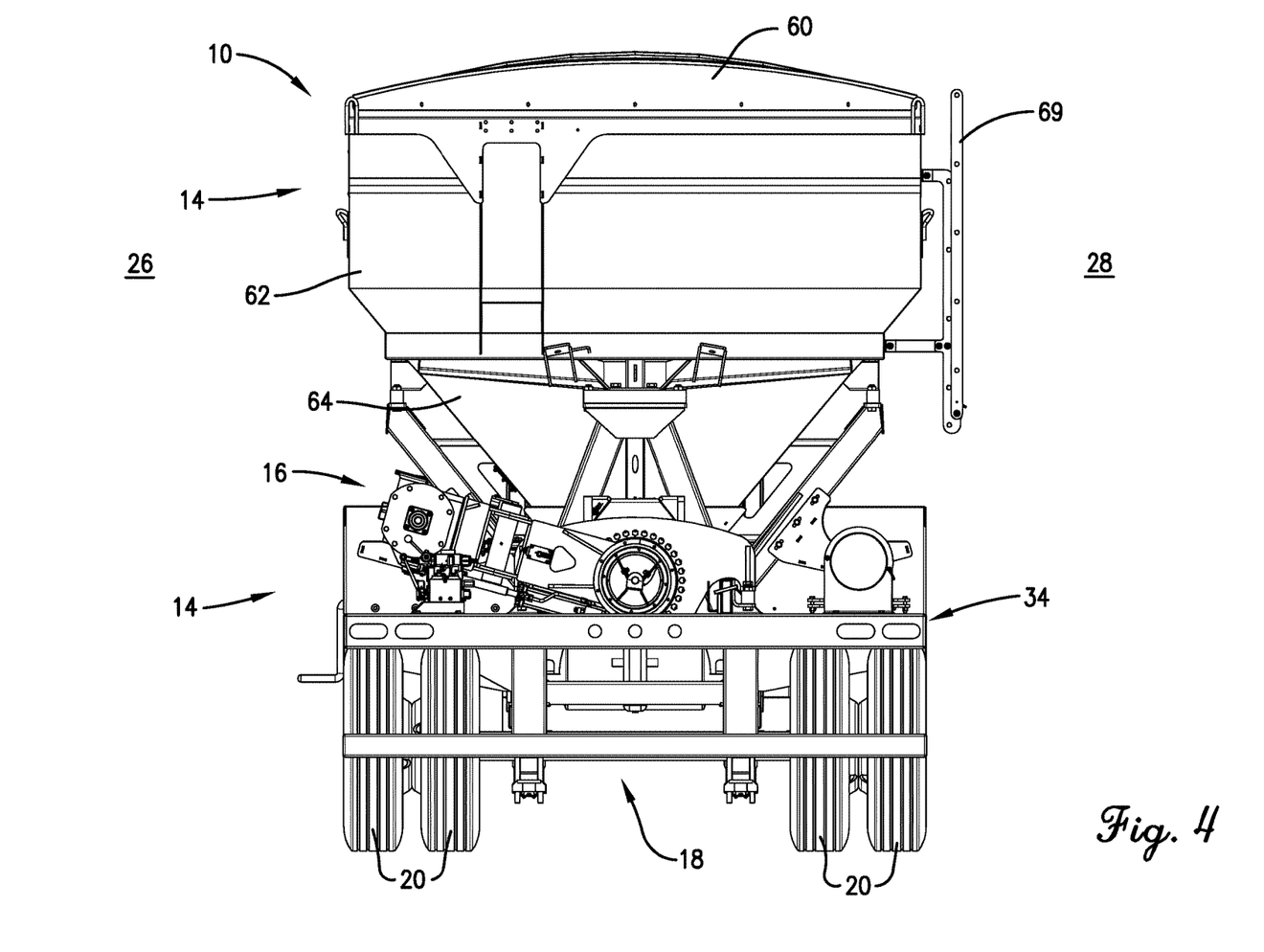
FIG. 4 is a rear view of the bulk material tender of FIG. 1.

In embodiments, the mobile frame 12 presents a generally elongated shape have an anterior end 22 and a posterior end 24, as best shown in FIGS. 1 and 3. The anterior end 22 and the posterior end 24 define a left side 26 and a right side 28, as best shown in FIGS. 1 and 4. The left side 26 and the right side 28 are disposed to the left and right of an observer seated atop the mobile frame 12 facing toward the anterior end 22. As discussed in depth below, embodiments of the invention allow for stowage of at least a portion of the discharge system 16 to both the left side 26 and the right side 28 of the mobile frame 12.

In embodiments of the invention, the chassis 18 includes a hauler interface 30, a main body 32, and a wheel platform 34, as best shown in FIGS. 1 and 3. The hauler interface 30 is disposed at the anterior end 22 of the chassis 18. The hauler interface 30 is configured to be secured to a tractor or other vehicle. The hauler interface 30 includes one or more side plates 36 and a central segment 38. In some embodiments, as best shown in FIG. 3, the hauler includes one or more telescoping legs 40 (best shown in FIG. 3) for supporting the chassis 18 of the mobile frame 12 while the hauler is not secured to the hauler interface 30.

The wheel platform 34 is disposed at the posterior end 24 of the chassis 18. The wheel platform 34 supports the wheels 20 and may include a fender 42 to at least partially protect the wheels 20. The wheel platform 34 may also provide a set of controls 44 for controlling the various hydraulic valves and other functions, as discussed more below. The set of controls 44 may be disposed on one or more of the fenders 42. The wheel platform 34 may further include a rear bumper 46.

Figure 8:
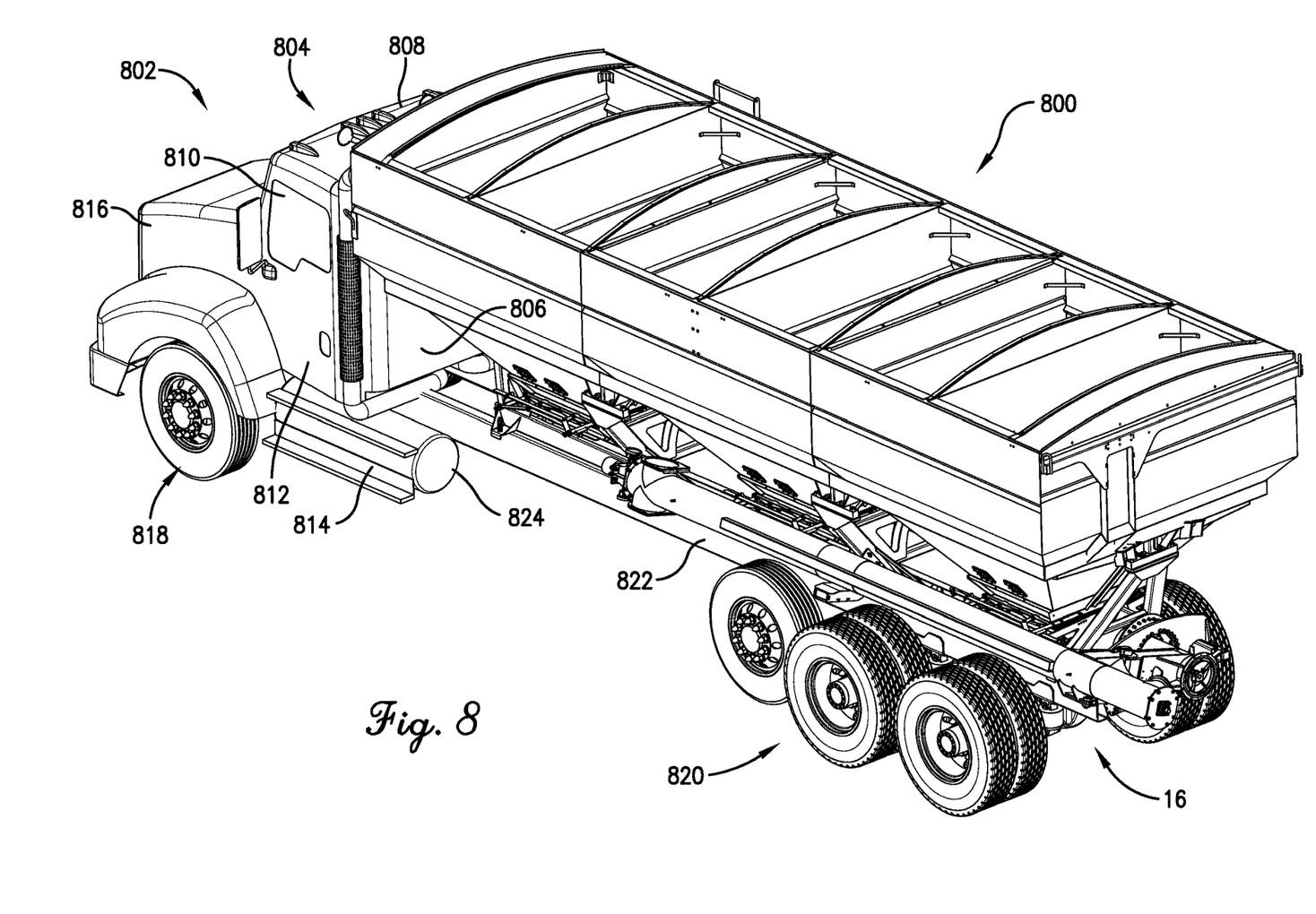
FIG. 8 is a perspective view of an alternative embodiment of a bulk material tender.

The embodiment of the invention illustrated in FIGS. 1 and 2A-D are configured to be externally propelled, e.g., pulled by a tractor (not illustrated). Other embodiments, such as illustrated in FIG. 8 and discussed below, are mounted directly to the chassis of a truck. In the embodiments of FIGS. 1 and 2A-D, the mobile frame 12 is a trailer configured to be pulled by a tractor or other machine. The trailer may be a more cost-effective option because the driver can utilize a standard tractor to move the trailer, without having a separate tractor specifically for the bulk material tender 10. The bulk material tenders 10 of these embodiments may include the chassis 18, the wheels 20, the hopper 14, and the discharge system 16 as illustrated.

In some embodiments, illustrated in FIG. 8 and discussed in detail below, the bulk material tender 10 is manned and self-propelled. In these embodiments, the mobile frame 12 is part of a tractor, vehicle, or other machine. In some embodiments, a motor is supported on the mobile frame 12 and configured to propel the mobile frame 12. Examples of a motor may include an internal combustion engine, a hybrid engine, an electric motor, or other power generator. The mobile frame 12 moves such that the particulate material may be spread evenly over a large area. The motor may be separate or the same as the motor which drives the hopper 14 and/or the discharge system 16 (as discussed below). In some embodiments, the hydraulics of the bulk material tender 10 may be powered by the tractor which is pulling the bulk material tender 10.

In other embodiments, not illustrated, the bulk material tender 10 is unmanned and self-propelled. In these embodiments, the bulk material tender 10 may include the above-discussed motor without the above-discussed cab. The bulk material tender 10 of this embodiment may be remotely driven or driven via artificial intelligence. In some embodiments, the bulk material tender 10 is equipped with an auger warning device (not illustrated). The auger warning device is a feature which warns the operator or an artificial intelligence system when the discharge system 16 is deployed out of the stowed position.

In embodiments of the invention, the hopper 14 is disposed on the mobile frame 12, as best shown in FIG. 1. More specifically, in embodiments of the invention, the hopper 14 is disposed on the main body 32 of the chassis 18. The hopper 14 of embodiments is generally elongated and aligned with the chassis 18. The hopper 14 includes at least one hopper void 48 configured to receive the particulate matter therein. The hopper 14 may include an open top 50 or one or more top caps (not illustrated) for covering the hopper 14 during transportation.

In embodiments of the invention, the hopper 14 includes two or more hopper segments 52. The hopper segments 52 may each individually be considered hoppers. The hopper segments 52 are each disposed adjacent to and distinct from each other. In some embodiments, as shown in FIG. 1, there are three hopper segments 52 disposed linearly along the main body 32 of the chassis 18. The hopper segments 52 (as best shown in FIG. 1) may include a fore hopper segment 54, a center hopper segment 56, and an aft hopper segment 58. In other embodiments, not illustrated, there may be more or fewer hopper segments 52.

Each hopper segment 52 may include a central divider 60. Each hopper segment 52 may also include an upper wall 62, and a funnel wall 64. The funnel wall 64 is disposed between the upper wall 62 and an auger interface 66. The funnel wall 64 presents a general pyramidal frustum shape. The auger interface 66 allows the particulate material to feed into a traversing auger 68 (which itself moves the particulate matter toward the discharge system 16, as discussed below). The upper wall 62 may have a ladder 69 secured thereto, to allow the operator to have access into the hopper void 48 of the hopper 14 through the open top 50.

Figure 5:
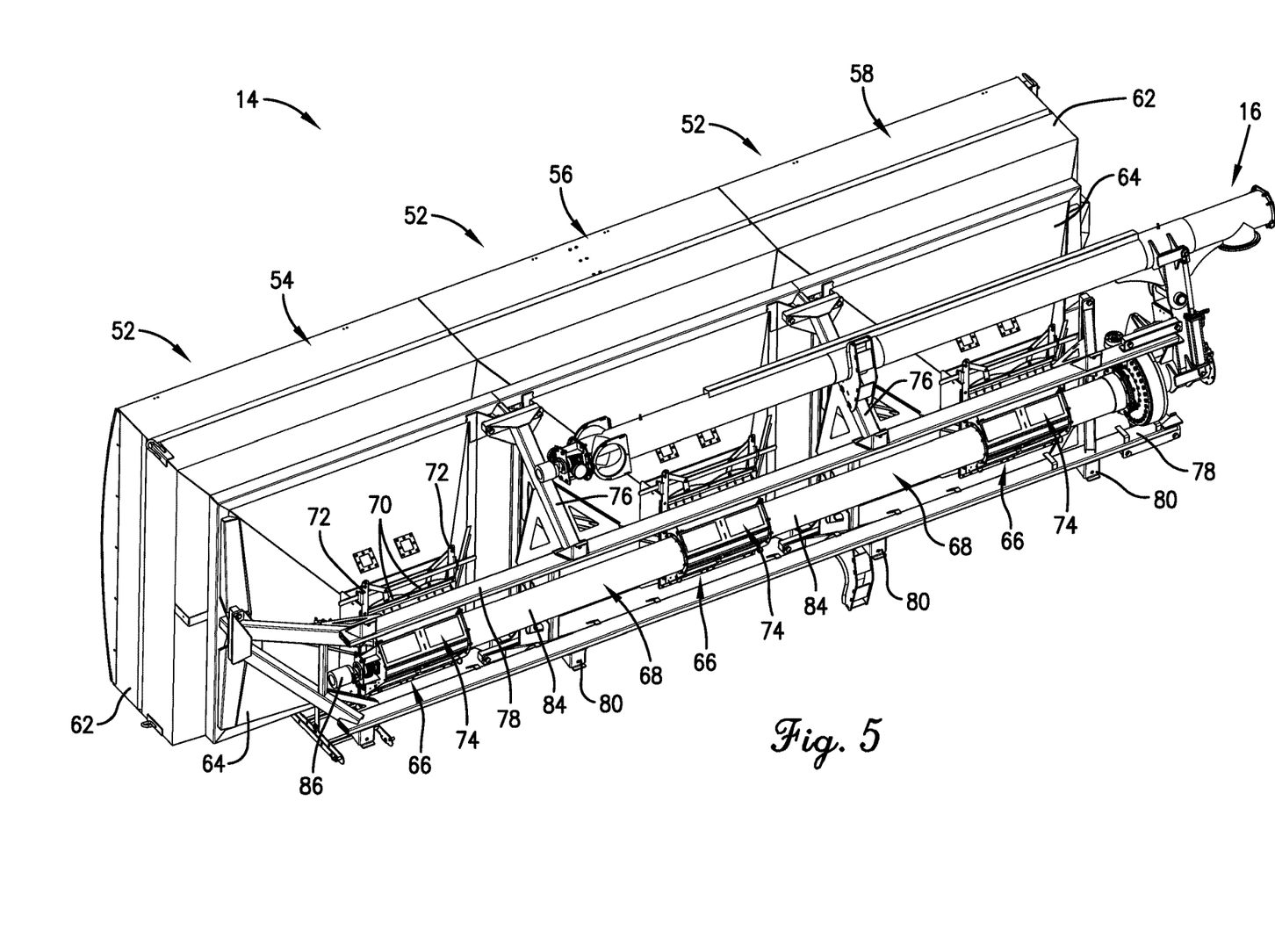
FIG. 5 is a perspective view of a hopper and a discharge system, shown from a lower anterior side.

The auger interface 66 is best shown in FIG. 5. The auger interface 66 includes a gate 70, a gate deployer 72, and an auger well 74. The gate 70 is configured to be opened and closed via the gate deployer 72 on either side of the bulk material tender 10 or both sides of the bulk material tender 10, such that user may selectively determine which of the hopper segments 52 to empty at a given time. Typically, the hopper segments 52 will be filled and transported with the gates 70 closed, and the operator opening the gates 70 when desired for discharge. The gates 70 may be manually or electronically controlled, as discussed below.

In some embodiments, the hopper segments 52 are utilized to allow for a customized combination of particulate material. Each hopper segment 52 may be filled with a distinct particulate material. The discharging of the particulate materials may thus mix the particulate materials into a desired mixture. The mixing may be determined based upon which of the gates 70 are open, the composition of the particulate matter in each hopper segment 52, the arrangement of the hopper segments 52, the rate of the traversing auger 68, and other considerations. In some embodiments, the mixture may be based upon a degree of openness of the gate 70, such that the gate 70 may be opened a certain fraction or degree so as to customize the flow rate for the particulate material. In embodiments, the mixture is regulated by the weight of the respective particulate matter. The weight of the particulate matter may be measured by scales (not illustrated) integrated into the hopper segment 52. In other embodiments, the mixture may be regulated by volume, mass flow rate, or some other measure.

The hopper 14, and or the hopper segments 52 individually, may include support braces 76 to support the hopper 14 and the particulate matter therein, as best shown in FIG. 5. The support braces 76 may be disposed at the anterior end 22, at the posterior end 24, and between the hopper segments 52. The support braces 76 may interface with one or more channel bracing 78. The channel bracing 78 runs generally along the bottom of the hopper 14. The channel bracing 78 includes two or more mounting brackets 80, as shown in FIG. 5. The mounting brackets 80 are configured to be secured to the main body 32 of the chassis 18. The support braces may further be configured to support at least a portion of the discharge system 16.

In embodiments of the invention, the hopper 14 includes the traversing auger 68. The traversing auger 68 moves the particulate matter from the hopper 14 toward the discharge system 16. In various embodiments, the traversing auger 68 may be considered a component of the discharge system 16, a component of the hopper 14, or an independent component. The traversing auger 68 may be associated with two or more auger interfaces 66 of the hopper segments 52 to receive the particulate matter from the respective hopper segments 52. The traversing auger 68 is disposed axially with the chassis 18. The traversing auger 68 thus generally moves the particulate matter rearward from the hopper 14 toward the posterior end 24 of the mobile frame 12. In other embodiments, the hopper 14 includes another type of conveyor for moving the particulate matter toward the discharge system 16. For example, the conveyor may be a blower or a conveyor belt, not illustrated.

The traversing auger 68 includes an auger 82 (best shown in FIG. 6A), one or more tube sections 84 (best shown in FIG. 5), and a motor 86 (best shown in FIG. 5). The auger 82 is disposed within at least a portion of the one or more tube sections 84 as well as the auger wells 74 of the hopper 14. The tube sections 84 are disposed between the auger wells 74. The motor 86 rotates the auger 82 within the tube sections 84 and the auger wells 74. The rotation of the helical auger pushes the particulate matter rearward toward the discharge system 16.

Exemplary Discharge System

Figure 2A:
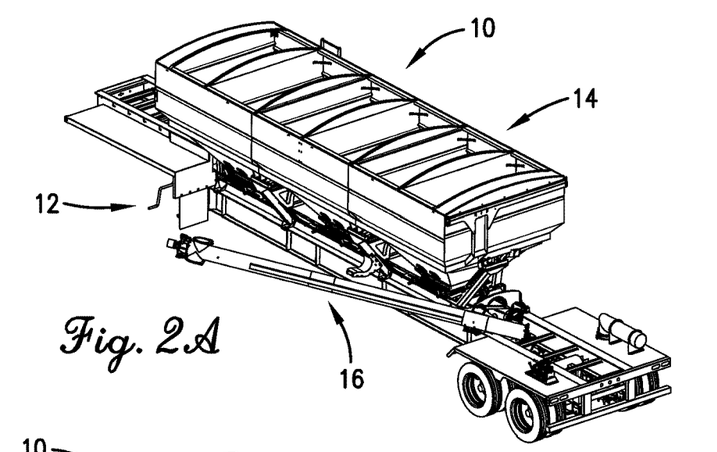
FIG. 2A is a perspective view of the bulk material tender of FIG. 1, but showing the discharge auger deployed on the left side.
Figure 2B:
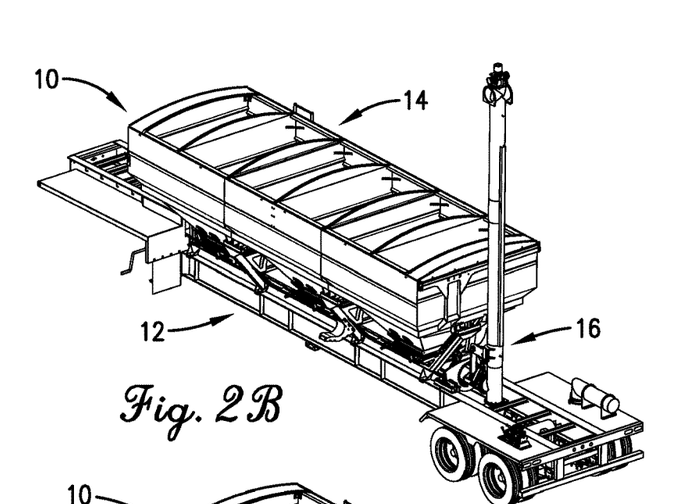
FIG. 2B is a perspective view of the bulk material tender of FIG. 1, but showing the discharge auger in an intermediate position.
Figure 2C:
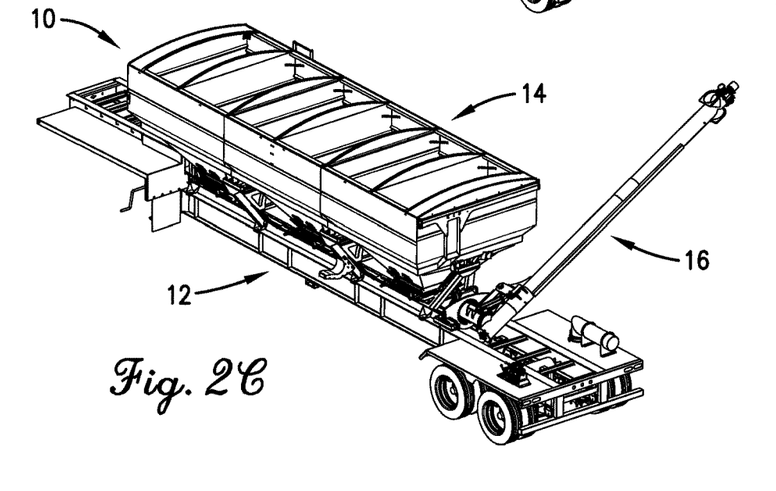
FIG. 2C is a perspective view of the bulk material tender of FIG. 1, but showing the discharge auger deployed on a right side.
Figure 2D:
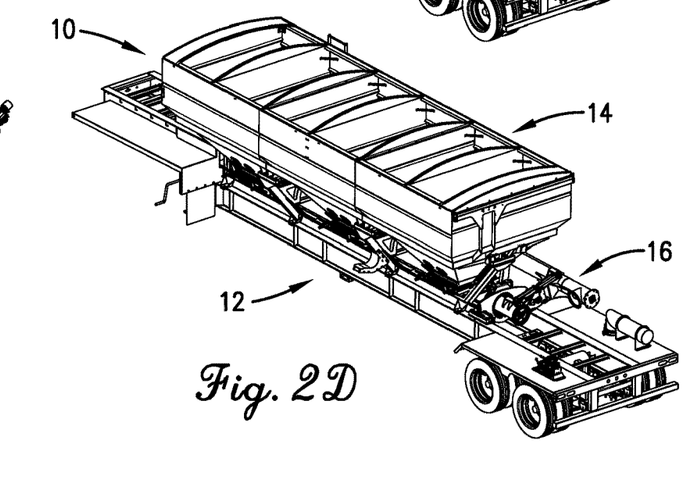
FIG. 2D is a perspective view of the bulk material tender of FIG. 1, but showing the discharge auger stowed on the right side.

The discharge system 16 of the bulk material tender 10 will now be discussed in more detail. The operation of the discharge system 16 is best shown in FIGS. 1 and 2A-D. FIG. 1 shows the discharge system 16 in a left stowed position. FIG. 2A shows the discharge system 16 in a left deployed position. FIG. 2B shows the discharge system 16 in an intermediate position. FIG. 2C shows the discharge system 16 in a right deployed position. FIG. 2D shows the discharge system 16 in a right stowed position. Embodiments of the invention are configured to move between the left stowed position (shown in FIG. 1), the left deployed position (shown in FIG. 2A), one or more intermediate positions (shown in FIG. 2B), the right deployed position (shown in FIG. 2C), and the right stowed position (shown in FIG. 2D). Thus, embodiments of the invention have increased range of motion and versatility compared to the above-discussed prior art.

Stowage on both the left side 26 and the right side 28 allows for more flexibility during deployment. It should be appreciated that the embodiments of the invention are utilized along edges of agricultural farms. These edges may allow travel only in a single direction, allow only limited mobility, present obstructions along an opposite side (such as a structure or woods). By allowing stowage on either side, embodiments of the invention allow for deployment from either side. As such, the operator may avoid the obstructions by stowing the discharge system 16 on the appropriate side prior to movement. Thus, various steps may be performed while the bulk material tender 10 is moving. Further, the operator need not reverse the bulk material tender 10, which can be difficult to maneuver in reverse.

Deployment on both the left side 26 and the right side 28 allows for more flexibility in operation. Because, as discussed above, the edge of the agricultural farm may allow for travel only in a single direction, thus the bulk material tender 10 may be forced to approach the target location only from that single direction. The target location may also be such that deployment from only one direction is possible. In some instances, there may be two adjacent target locations disposed to both sides of a single road. Prior art bulk material tenders would be required to discharge to one direction, leave, turn around, and return such that the bulk material tender 10 could discharge to the other side of the single road.

The discharge system 16 generally comprises a discharge auger 88, a deploying actuator 90, and a positioning actuator 92. The discharge auger 88 receives the particulate material from the hopper 14 (such as via the traversing auger 68) and discharges the particulate matter toward the target location. The deploying actuator 90 moves the discharge auger 88 between a stowed position and a deployed position. The positioning actuator 92 changes an angular position of the discharge auger 88 relative to the chassis 18 so as to change a discharge height, move the discharge auger 88 to an opposite side of the chassis 18, or perform other functions.

Figure 6A:
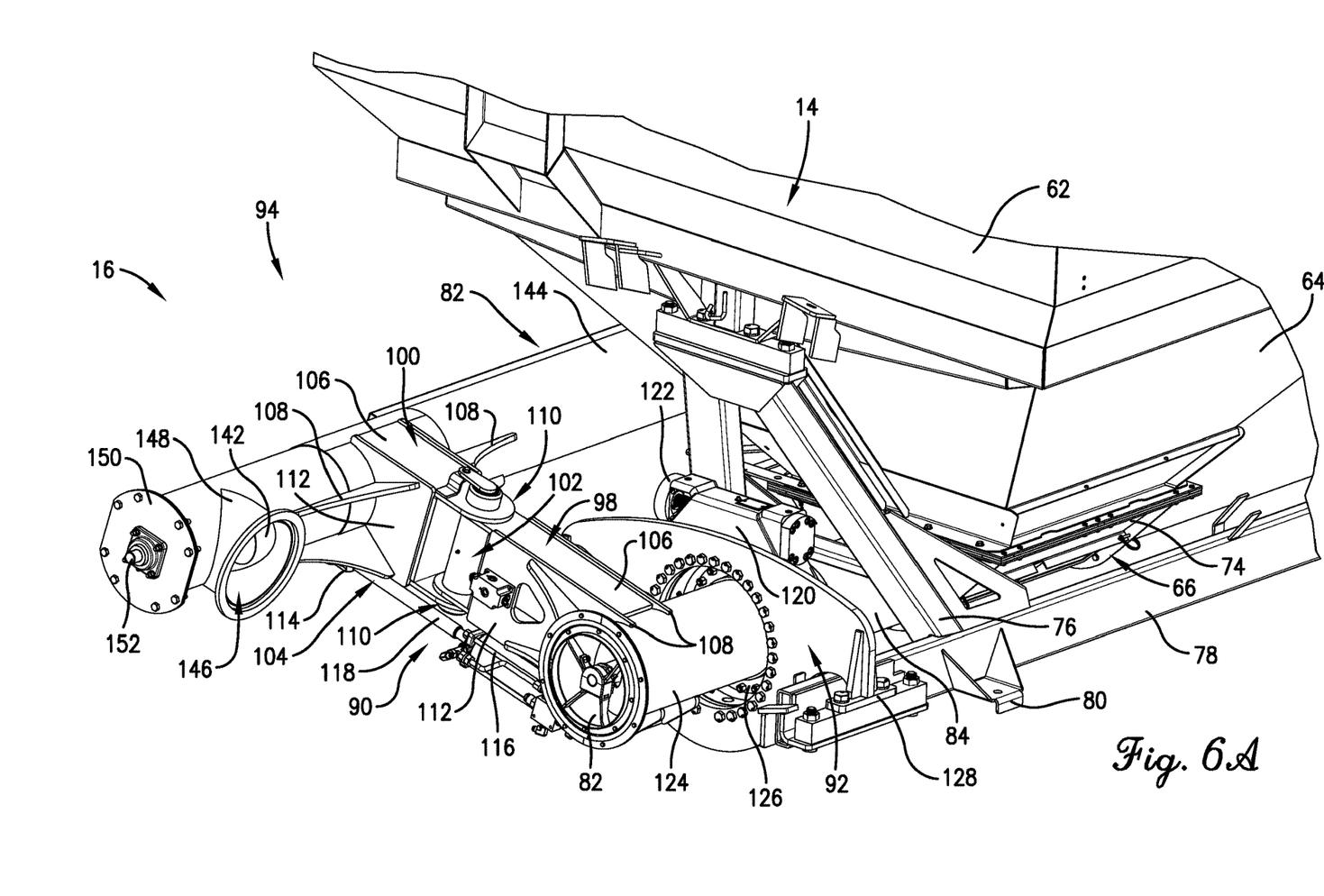
FIG. 6A is a perspective view of a first embodiment of the discharge system, having a rotary hydraulic actuator.
Figure 7:
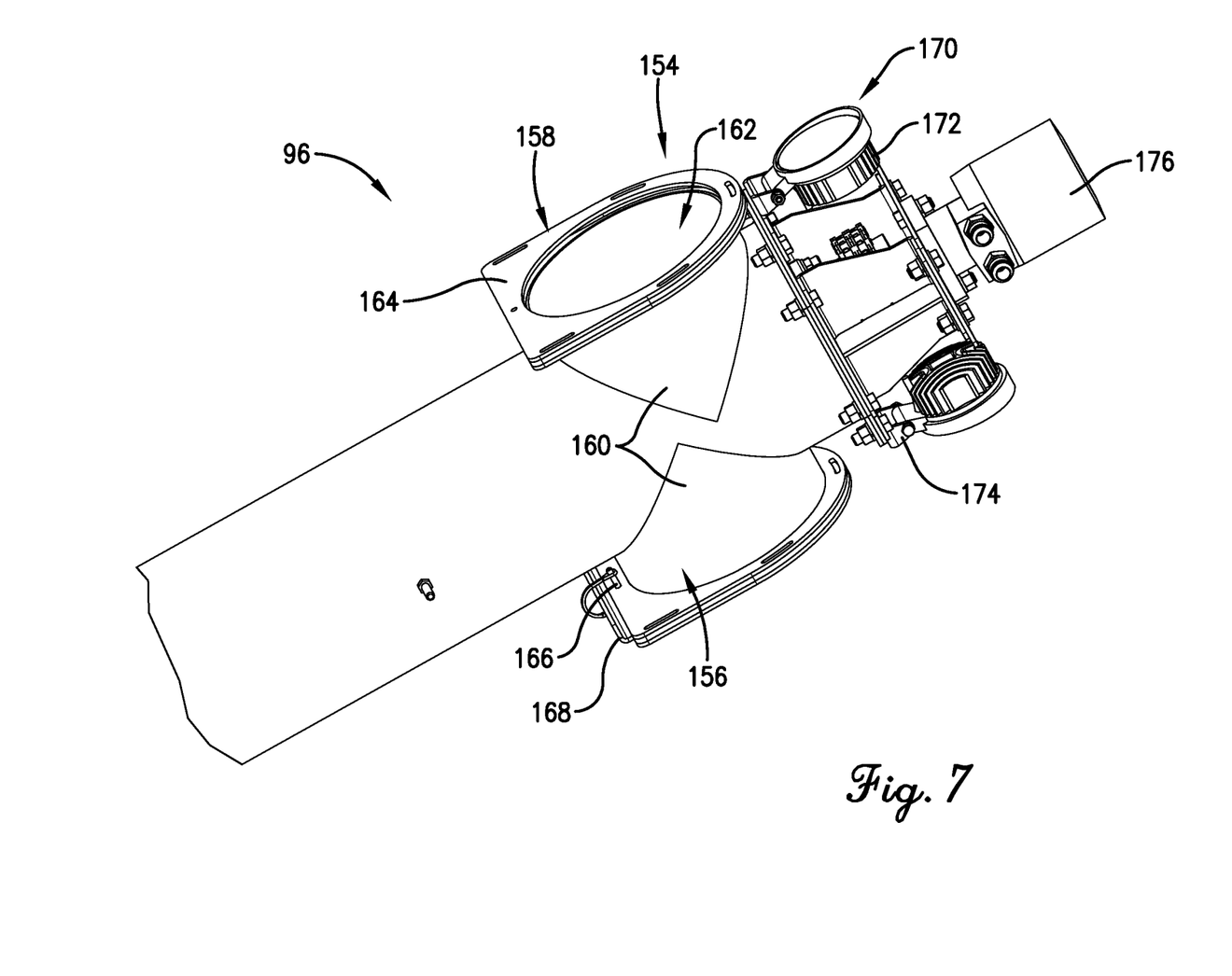
FIG. 7 is a perspective view of a distal end of the discharge auger showing a dual chute assembly.

The discharge auger 88 is generally elongated and presents a proximal end 94 (best shown in FIG. 6A) and a distal end 96 (best shown in FIG. 7). The proximal end 94 is pivotably attached to the deploying actuator 90. The deploying actuator 90 moves the discharge auger 88 between a stowed position (as shown in FIGS. 1 and 2D), in which the discharge auger 88 is generally parallel with the chassis 18, and a deployed position (as shown in FIGS. 2A-C), in which the discharge auger 88 is generally perpendicular to the chassis 18. The distal end 96 of the discharge auger 88 is adjacent to the hopper 14 in the stowed orientation and laterally spaced from the hopper 14 in the deployed orientation. The proximal end 94 of the discharge auger 88 is spaced away from the hopper 14 (specifically the traversing auger 68) in the stowed position and is proximate to the hopper 14 in the deployed position. Thus, when the discharge auger 88 is in the deployed position, the discharge auger 88 is substantially perpendicular to the traversing auger 68. Further, when the discharge auger 88 is in the stowed position, the discharge auger 88 is substantially parallel to the traversing auger 68.

The deploying actuator 90 of embodiments of the invention comprises a proximal mount 98, a distal mount 100, a central pivot 102, and a linear actuator 104. The proximal mount 98 is secured to the traversing auger 68 and/or the positioning actuator 92. The distal mount 100 is secured to the discharge auger 88. The central pivot 102 is disposed between the proximal mount 98 and the distal mount 100. The central pivot 102 allows the distal mount 100 to pivot relative to the proximal mount 98. The linear actuator 104 pushes or pulls the distal mount 100 and/or the discharge auger 88 relative to the proximal mount 98.

In embodiments of the invention, as best shown in FIG. 6A, the proximal mount 98 and the distal mount 100 each comprise a mount body 106, one or more support members 108, and two pivot protrusions 110. The mount body 106 includes walls 112. The one or more support members 108 are secured to the walls 112 to provide additional structural support. The two pivot protrusions 110 (of both the proximal mount 98 and the distal mount 100) extend from the mount body 106 toward the central pivot 102. The two pivot protrusions 110 are each disposed over and under at least a portion of the central pivot 102. The central pivot 102 is thus disposed between the two pivot protrusions 110 of both the proximal mount 98 and the distal mount 100. Each of the four pivot protrusions 110 is pivotably secured to the central pivot 102.

The linear actuator 104 may be secured at a discharge pivot 114. The discharge pivot 114 may be disposed on the distal mount 100 (as shown in FIGS. 5 and 6A) or the discharge auger 88. The discharge pivot 114 allows the distal mount 100 (and by extension, the discharge auger 88 secured thereto) to pivot relative to the linear actuator 104. Thus, as the linear actuator 104 pushes and/or pulls on the discharge pivot 114, the linear actuator 104 pivots relative to the discharge pivot 114 and the distal mount 100 correspondingly rotates about the central pivot 102.

The linear actuator 104 may be one or more hydraulic cylinders. The hydraulic cylinders may include a piston 116 and a tube 118. The linear actuator 104 may further include an intermediate segment (not illustrated). The piston 116 (and/or the intermediate segment) moves relative to the tube 118 based upon hydraulic fluid being forced into the tube 118. In some embodiments, the hydraulic cylinders are double-acting cylinders. Double-acting cylinders can be forced to elongate and retract based upon which side of the piston 116 the hydraulic fluid is forced. In other embodiments, the hydraulic cylinders are single-acting cylinders, or some other combination thereof. Single-acting cylinders can only be forced to operate in one direction, and move in the other direction under gravity or some other external force. In other embodiments, not illustrated, a rotary actuator may be utilized for the deploying actuator 90.

The positioning actuator 92 will now be discussed in more detail. The positioning actuator 92 is configured to selectively emplace the discharge auger 88 along the left side 26 (as shown in FIGS. 1 and 2A), along the right side 28 (as shown in FIGS. 2C and 2D), or in intermediate positions (as shown in FIG. 2B). The positioning actuator 92 moves the discharge auger 88 by rotating the discharge auger 88 through a plane perpendicular to the traversing auger 68. As such, the operator can select a side and a height for the discharge operation and decide an appropriate side for the stowage of the discharge auger 88.

In some embodiments, the positioning actuator 92 is a hydraulic rotary actuator, as shown in FIG. 6A. In these embodiments, the hydraulic rotary actuator includes a worm drive 120 for rotating the discharge auger 88 relative to the chassis 18. The worm drive is powered by a hydraulic motor 122. The hydraulic motor 122 is secured to a rotating tube segment 124 of the traversing auger 68. The rotating tube segment 124 rotates relative to the tube of the traversing auger 68. The auger 82 of the traversing auger 68 may be at least partially disposed within the rotating tube segment 124. A worm screw (not illustrated) drives a worm wheel 126. The worm wheel 126 is secured to the rotating tube segment 124 so as to induce the rotating. The proximal mount 98 is also secured to the rotating tube segment 124 such that a rotation imparted on the rotating tube segment 124 by the worm wheel 126 induces the same rotation on the proximal mount 98. The rotation of the proximal mount 98 rotates the discharge auger 88 between the above-discussed left side 26, right side 28, and intermediate locations. The positioning actuator 92 may also include a bracket 128 securing the positioning actuator 92 to the channel bracing 78 and/or the chassis 18 of the mobile frame 12. In other embodiments, the positioning actuator 92 is a pneumatic motor. In still other embodiments, the positioning actuator 92 is an electric motor.

Figure 6B:
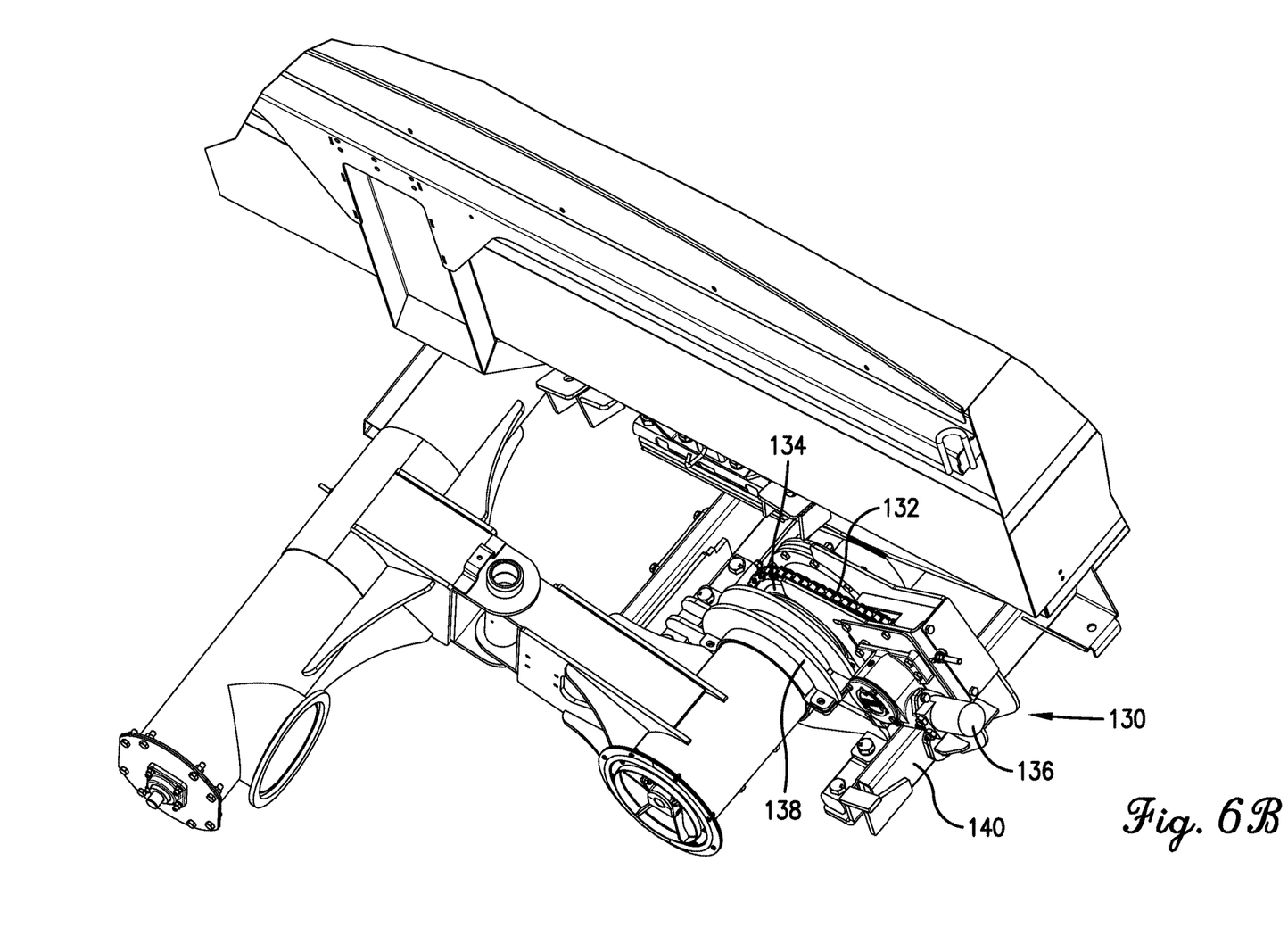
FIG. 6B is a perspective view of a second embodiment of the discharge system, having a chain-sprocket rotator.

In other embodiments, as illustrated in FIG. 6B, the positioning actuator 92 is a chain-sprocket rotator. In these embodiments, the positioning actuator 92 utilizes a chain drive 130 for rotating the discharge auger 88 relative to the chassis 18. The chain drive 130 includes a drive chain 132 that is powered by a drive wheel (not directly illustrated). The drive wheel rotates, so as to impart a rotation on the drive chain 132. The rotation of the drive chain 132 is imparted on an idler wheel 134. The idler wheel 134 is secured to the rotating tube segment 124 so as to induce the rotating. In embodiments, the chain drive 132 is powered by a hydraulic motor 136. The hydraulic motor 136 turns the drive wheel, which turns the drive chain 132 and the idler wheel 134. In some embodiments, the idler wheel 134 is supported via a wheel bracket 138, and the drive wheel and the hydraulic motor 136 are support via a motor bracket 140. Each of the wheel bracket 138 and the motor bracket 140 are secured to the channel bracing 78 and/or the chassis 18 of the mobile frame 12. In other embodiments, the rotation may be provided by belt- or gear-driven systems.

The discharge auger 88 will now be discussed in more detail. In embodiments of the invention, the discharge auger 88 includes auger body 142 and tube 144. The auger body 142 is disposed at least partially within the tube 144. The auger body 142 rotates relative to the body so as to move the particulate material along the tube 144 to be discharged. More specifically, the auger body 142 rotates relative to the tube 144 so as to transfer particulate matter from the proximal end 94 toward the distal end 96. In other embodiments, the discharge auger 88 includes another type of conveyor for discharging the particulate matter. For example, the conveyor may be a blower or a conveyor belt, not illustrated. The conveyor belt or blower may work in combination with a corresponding conveyor belt or blower of the hopper 14, discussed above.

The proximal end 94 of the discharge auger 88 presents a discharge input opening 146. The discharge input opening 146 is configured to be placed securely against the traversing auger 68 so as to receive particulate matter from the traversing auger 68. When in the deployed position, the discharge auger 88 is perpendicular and proximate to the traversing auger 68. The discharge input opening 146 is formed by an annular protrusion 148 extending laterally from the tube 144 of the discharge auger 88. The proximal end 94 of the discharge auger 88 may further include a proximal cap 150 and an auger pivot 152. The proximal cap 150 is secured to the proximal end 94 to seal the proximal end 94. The auger pivot 152 is secured to the proximal cap 150. The auger pivot 152 allows the auger body 142 to rotate relative to the chute.

A dual chute assembly 154 is disposed at the distal end 96. The dual chute assembly 154 is configured to discharge the particulate matter toward the left side 26 and the right side 28 based at least in part on the positioning actuator 92. The dual chute assembly 154 includes a left-side chute 156 and a right-side chute 158. The left-side chute 156 is oriented such that the left-side chute 156 is oriented downward when the discharge auger 88 is in the left deployed position. The right-side chute 158 is oriented such that the right-side chute 158 is oriented downward when the discharge auger 88 is in the right deployed position. In some embodiments, each of the left side 26 chute and the right side 28 chute are selectively opened by the operator. Thus, depending upon the side to which the particulate material is to be discharged, the operator can selectively and manually open the respective left-side or right-side chute 156,158. In other embodiments, the opening of the respective chute 156,158 may be performed automatically.

The left-side chute 156 and the right-side chute 158 each comprise an annular protrusion 160, a chute opening 162, a chute faceplate 164, a securing pin 166, and a chute cover 168. The annular protrusions 160 each extend laterally from the tube 144 of the discharge auger 88. The annular protrusions 160 device the chute opening 162 therein. In some embodiments, as shown in FIG. 7, the chute opening 162 is generally circular. In other embodiments, the chute opening 162 may be elliptical, rectangular, or another shape. In some embodiments, as best shown in FIG. 7, the annular protrusion of the left-side chute 156 is offset from the annular protrusion of the right side 28 chute. This may be done for ease of manufacturing or other advantages.

The chute faceplate 164 is disposed away from the tube 144 of the discharge auger 88. The chute faceplate 164 is configured to receive the securing pin 166 therein. The securing pin 166 attaches and secured the chute cover 168 to the chute faceplate 164. The chute faceplate 164 is configured to receive the chute cover 168 therein, such as by the operator sliding the chute cover 168 into at least a portion of the chute faceplate 164. The securing pin 166 is then emplaced through the chute cover 168 and the chute faceplate 164 so as to keep the chute cover 168 in place relative to the chute faceplate 164. Thus, the operator may change the operating side of the chute assembly 154 by removing the chute cover 168 from the left-side chute 156 and emplacing the chute cover 168 for the right-side chute 158 (or vice versa). In some embodiments, the chute assembly 154 is provided with a single chute cover 168, which the operator moves between the left-side chute 156 and the right-side chute 158 as needed.

In some embodiments of the invention, the discharge auger 88 further comprises a lighting system 170. The lighting system 170 illuminates the target location from the distal end 96 of the discharge auger 88. The lighting system 170 assists the operator in observing the target location, ensuring the provision of particulate matter at the target location, and providing general lighting at the work site in low-light environments. The lighting system 170 may be oriented to both the left side 26 and the right side 28, such that the operator may select in which direction to shine the light from the lighting system 170. In some embodiments, the lighting system 170 includes light-emitting diodes (LEDs) at the distal end 96 of the discharge auger 88. The lighting system 170 may include a radiator 172 to reduce heat generated by the lighting system 170. The lighting system 170 may further include a lighting bracket 174 securing the lighting system 170 to the distal end 96 of the discharge auger 88.

In some embodiments, the discharge auger 88 may be equipped with a camera system (not illustrated). The camera system is oriented so as to provide a field of view oriented toward the target location. The camera system may feed video data to a display such that it may be viewed by the operator.

Finally, the distal end 96 of the discharge auger 88 may include a hydraulic motor 176. The hydraulic motor 176 turns the auger body 142 within the tube 144, or otherwise induces a rotation therein. The auger body 142 may be pivotably attached at the hydraulic motor and at the auger pivot 152 at the proximal end 94 of the discharge auger 88. The hydraulic motor 176 may begin operating upon instruction from the operator, such as at the set of controls 44 or by an electronic control unit. The hydraulic motor 176 may be secured to the lighting bracket 174 of the lighting system 170, or directly to the tube 144 of the discharge auger 88.

The user may desire to have the discharge auger 88 disposed a certain distance above the target location, a certain distance above a known or reference height (as measured via a sensor, for example), or a certain distance above the ground level. The user (and/or a controller, discussed below) will position the positioning actuator 92 such that the dual chute assembly 154 is placed at the certain distance. The user may also desire to have the discharge auger 88 dispose a certain amount of particulate matter. The discharge auger 88 (or other component of the bulk material tender 10) may calculate or sense the amount of particulate matter being disposed, and may provide a readout or cease operations based upon the amount.

Exemplary Alternative Bulk Material Tender

Turning to FIG. 8, an alternative embodiment of the bulk material tender 800 is shown, which includes a tractor 802. The alternative embodiment is vehicle-based in lieu of the trailer-based embodiment shown in FIGS. 1 and 2A-D. The vehicle-based embodiment is self-propelled and configured to support a driver thereon for operation of the tractor 802. The tractor preferably includes a cab 804 or other seat for the driver. The cab is supported on the chassis 18 of the mobile frame 12 and configured to support the driver. In some embodiments, the cab may include walls 806, a roof 808, windows 810, and a door 812. The mobile frame 12 may further include steps 814 to allow the driver to easily access the cab.

The tractor 802 may include an engine compartment 816 housing an internal combustion engine (not directly illustrated) therein. The tractor may further include two or more anterior wheels 818. The set of anterior wheels 818 and a corresponding set of posterior wheels 820 are rotatably disposed to a chassis 822 of the tractor 802. The internal combustion engine powers the anterior wheel 818 and/or the posterior wheels 820. The internal combustion engine may also power one or more of the hydraulic pumps discussed above. The internal combustion engine may receive fuel from one or more fuel tanks 824

The alternative embodiment utilizes the discharge system 16 discussed above. The hopper 14 and the discharge system 16 are both secured to the chassis 822 of the tractor 802. The discharge system may be controlled via the below-discussed control steps.

Exemplary Control Steps

The bulk material tender 10 may be controlled by the set of controls 44 on the fender 42 of the mobile frame 12 (or any area that provides accessibility), by an electronic control unit, or both. The set of controls 44 operates hydraulic valves which open and close so as to control the operation of the bulk material tender 10. The electronic control unit receives various inputs and/or commands and controls the operation of the discharge system 16 and the hopper 14 (and may control other functions of the mobile frame 12 and/or tractor, such as the driving). The electronic control unit may monitor the status and setting of various systems and may be used as remote control device, such as a height of the chute.

A method of discharging particulate matter from a hopper 14 will now be discussed. The method includes deploying, via a deploying actuator 90, a discharge auger 88 from a stowed position adjacent to the hopper 14 on the first side to a deployed position. In the deployed position, the discharge auger 88 is perpendicular to the hopper 14. Next, the method includes rotating, via a positioning actuator 92, the discharge auger 88 to a first discharging position on the first side. Next, the method includes rotating, via the positioning actuator 92, the discharge auger 88 to a second discharging position on the second side. The first discharge position and the second discharge position may each have an associated height or angular setting relative to the chassis 18. In some instances, the height and/or angular setting of the first discharge position is the same, though on the opposite side, as the height and/or angular setting of the second discharge position. Next, the method includes rotating the traversing auger 68 and the discharge auger 88 such that particulate material from the hopper 14 is moved rearward by the traversing auger 68 and generally upward by the discharge auger 88 until the particulate matter reaches the chute assembly 154. The particulate matter is allowed to fall from the chute assembly 154 toward the target location.

In some embodiments, the electronic control unit may receive input that instruct the electronic control unit as to the height of the chute assembly 154 as desired by the operator. The electronic control unit may also receive passive or active height sensor feedback. This is indicative of the height of the chute relative to the height of the target location. The electronic control unit may also receive input from sensors associated with the deploying actuator 90 and/or the positioning actuator 92. These may be indicative of the position of the discharge auger 88 relative to the chassis 18. The electronic control unit may also control the chute assembly 154, such as to open the left-side chute 156 or the right-side chute 158 depending upon the orientation of the discharge auger 88. The electronic control unit may also control the lighting system 170 of the discharge system 16.

Based upon the above discussed inputs, the electronic control unit and/or the user may determine that a change in the position of the discharge system 16 is needed. The electronic control unit may send an instruction to a set of hydraulic valves and/or the user may manually operate the set of hydraulic valves from the set of controls 44.

Some embodiments of the invention are directed to a computerized method of controlling the bulk material tender 10 to discharge the particulate matter, wherein the computerized method includes the above-discussed steps. Still other embodiments of the invention may be directed to a non-transitory computer readable storage medium having a computer program stored thereon, wherein the computer program instructs the electronic control unit (or other processing element(s)) to perform the above-discussed steps.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claim(s) set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in the paragraph shall apply unless so stated in this description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

We claim:

1. A bulk material tender comprising:
a mobile frame having a left side and a right side;
a hopper disposed on the mobile frame; and
a discharge system configured to discharge particulate matter from the hopper toward a target location,
said discharge system including—
a discharge auger presenting a proximal end and a distal end;
a deploying actuator configured to selectively emplace the discharge auger in a stowed orientation and a deployed orientation,
wherein the distal end is adjacent to the hopper in the stowed orientation; and
a positioning actuator configured to selectively emplace the discharge auger along the left side and the right side of the mobile frame,
wherein the discharge auger includes a dual chute assembly configured to discharge the particulate matter toward the left side and the right side based at least in part on a position of the positioning actuator,
wherein the dual chute assembly includes a left-side chute and a right-side chute, and
wherein each of the left-side chute and the right-side chute are selectively opened by an operator.

2. The bulk material tender of claim 1, wherein the mobile frame is a trailer configured to be pulled.

3. The bulk material tender of claim 1,
wherein when the discharge auger is in the deployed position, the discharge auger is substantially perpendicular to a traversing auger,
wherein when the discharge auger is in the stowed position, the discharge auger is substantially parallel to the traversing auger.

4. The bulk material tender of claim 1,
wherein the discharge auger includes an auger body and a tube,
wherein the auger body is disposed within the tube,
wherein the auger body is configured to rotate relative to the tube so as to transfer particulate matter from the proximal end toward the distal end of the discharge auger.

5. The bulk material tender of claim 1, wherein the left-side chute includes—
an annular protrusion extending laterally;
a chute faceplate secured to a distal end of the annular protrusion; and
a chute cover configured to selectively close the left-side chute.

6. The bulk material tender of claim 1,
wherein the positioning actuator is a hydraulic rotary actuator,
wherein the positioning actuator includes a worm drive powered by a hydraulic motor.

7. The bulk material tender of claim 1,
wherein the positioning actuator is a chain-sprocket rotator,
wherein the chain-sprocket rotator includes a chain drive powered by a hydraulic motor.

8. The bulk material tender of claim 1, further comprising:
a traversing auger configured to transfer particulate matter from the hopper to the discharge auger.

9. The bulk material tender of claim 8,
wherein the deploying actuator is hydraulic linear actuator associated with a central pivot,
wherein the deploying actuator is secured to a proximal mount that is secured to a rotating tube segment of the traversing auger,
wherein the deploying actuator is secured to a distal mount that is secured to the discharge auger.

10. The bulk material tender of claim 8, further comprising:
a lighting system secured to the distal end of the discharge auger,
wherein the lighting system is configured to illuminate the target location.

11. A discharge system configured to discharge particulate matter from a hopper toward a target location, said discharge system comprising:
a discharge auger presenting a proximal end and a distal end;
a deploying actuator configured to selectively emplace the discharge auger in a stowed orientation and a deployed orientation,
wherein the distal end is adjacent to the hopper in the stowed orientation; and
a positioning actuator configured to selectively emplace the discharge auger along the left side and the right side of the hopper,
wherein the discharge auger further comprises:
a dual chute assembly disposed at the distal end, wherein the dual chute assembly includes a left-side chute and a right-side chute, wherein each of the left-side chute and the right-side chute are selectively opened by an operator, wherein the dual chute assembly is configured to discharge the particulate matter toward the left side and the right side based at least in part on a position of the positioning actuator.

12. The discharge system of claim 11, wherein the deploying actuator is a hydraulic linear actuator associated with a central pivot, wherein the deploying actuator is secured to a proximal mount that is secured to a rotating tube segment of the hopper, wherein the deploying actuator is secured to a distal mount that is secured to the discharge auger.

* * * * *